United States Patent [19]

Gilles

[11] 4,274,650

[45] Jun. 23, 1981

[54] HAND DRIVE ASSEMBLY FOR A WHEELCHAIR

[76] Inventor: Hans Gilles, 249 Springhill, Rosemere, Quebec, Canada

[21] Appl. No.: 50,569

[22] Filed: Jun. 21, 1979

[51] Int. Cl.[3] .......... B62M 1/14

[52] U.S. Cl. .......... 280/242 WC; 74/63; 280/249; 280/260

[58] Field of Search .......... 280/242 WC, 242 R, 249, 280/260; 74/63

[56] References Cited

U.S. PATENT DOCUMENTS

| | | | |
|---|---|---|---|
| 292,179 | 1/1884 | Riley | 280/249 |
| 661,992 | 11/1900 | Hunt | 280/260 |
| 1,687,812 | 10/1928 | Weber | 280/242 WC |
| 2,643,898 | 6/1953 | Everest | 280/242 WC |
| 2,847,058 | 8/1958 | Lee | 280/249 X |
| 3,937,519 | 2/1976 | Schoolden | 280/242 WC |

FOREIGN PATENT DOCUMENTS

| | | | |
|---|---|---|---|
| 2307697 | 12/1976 | France | 280/242 WC |
| 11536 | of 1898 | United Kingdom | 280/260 |
| 16934 | of 1899 | United Kingdom | 280/260 |

*Primary Examiner*—John P. Silverstrim

[57] ABSTRACT

A hand drive assembly for a wheelchair is disclosed. The assembly comprises a main axle adapted to be installed on each side of a regular wheelchair for rotatably mounting the wheel of the chair, a main gear rotatably mounted on the main axle and adapted to be coupled to the wheel, an elongated plate mounted upwardly at one end on the main axle and at a predetermined angular position with respect to the vertical ahead of the wheel, a driving axle rotatably mounted at the other end of the gear plate, a driving gear secured to the driving axle, a hand drive ring coupled to the driving axle for driving such driving gear, and an intermediate gear rotatably mounted on the gear plate and coupling the driving gear to the main gear to transmit motion of the hand drive ring to the regular wheel of the wheelchair.

1 Claim, 7 Drawing Figures

HAND DRIVE ASSEMBLY FOR A WHEELCHAIR

This invention relates to a wheelchair and, more particularly, to a new hand drive assembly for a wheelchair.

At the present time, all hand-operated wheelchair have a circular hand operated driving ring concentric with the wheel of the chair on each side of the chair, such driving ring being of course of a slightly smaller diameter than that of the wheels to clear the ground but large enough to provide sufficient torque. With this arrangement the occupant's hands and clothing often become soiled by contact with the driving ring which picks up dirt, snow or the like from the ground.

Furthermore, on all existing wheelchairs, the wheel axle must be substantially in vertical line with the back-rest in order to eliminate the danger of falling backward. Because the driving ring is concentric with the wheel, the occupant has to reach back to grab the driving ring, which is an unnatural position for the arms, thus causing unnecessary fatigue.

It is therefore the object of the present invention to provide a hand drive assembly for a wheelchair which is simple in construction and which will require less effort on the part of the occupant to drive his chair by providing him with a more accessible driving ring which, at the same time, is sufficiently high above ground to remain clean and, thus, prevents soiling of the occupant.

SUMMARY OF THE INVENTION

The hand drive assembly in accordance with the invention is for use in association with a wheelchair having a chassis, a seat, a back-rest, a pair of front smaller diameter ground-engaging swivel wheels terminating below the seat and a pair of back, larger diameter ground-engaging driving wheels extending above the seat, said seat back-rest and front and back wheels all carried by said chassis, the back wheels mounted on said chassis on each side of said seat for independent rotation about a horizontal axis transverse to, and located, below the seat in the region of the back-rest. The hand drive assembly comprises a main gear fixed to, and co-axial with, each back wheel, a plate fixed to each side of the chassis, a pair of hand-operated driving rings of a diameter substantially equal to the diameter of the back wheels and carried by the respective plates for rotation about a transverse horizontal axis parallel to the rotation axis of the back wheels and upwardly and forwardly spaced from the last-named rotation axis, the rings being located on the outside of the respective drive wheels and overlapping the latter. The drive assembly further includes a driving gear fixed to, and co-axial with, each driving ring and transmission means drivingly interconnecting the main gear and the driving gear for rotation of said gears in the same direction. Preferably, the transmission means consist of an intermediate gear meshing with the main gear and the driving gear. Preferably also, the back wheels and the main gears are mounted on main axles, which are fixed to the chassis and the plate is an elongated plate which is fixed at one end to the outer end of the main axle, while the driving ring and its associated driving gear are rotatably mounted on the outer end of said elongated plate, and there are further means to adjust the angular position of the elongated plate with respect to the main fixed axle, so as to be able to adjust the height of the driving ring to suit the individual user.

The invention will now be disclosed, by way of example, with reference to the accompanying drawings, in which.

Figure 1:
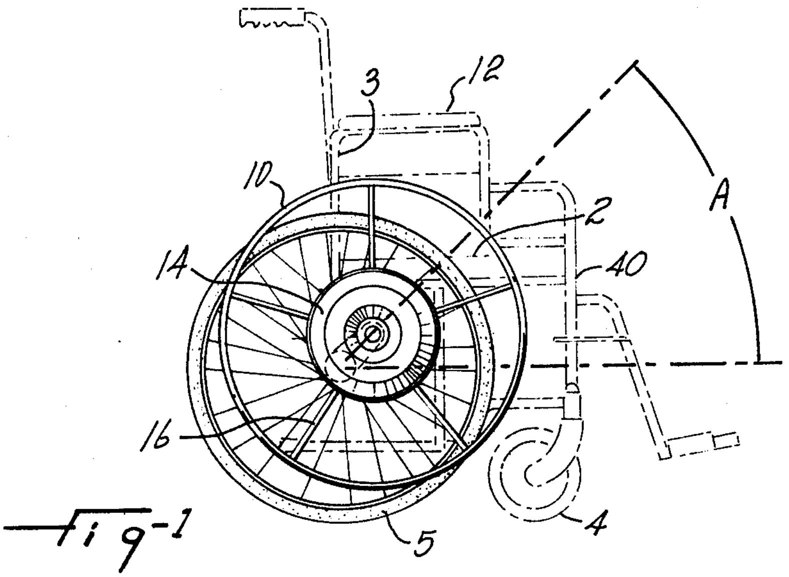
FIG. 1 illustrates a side view of a wheelchair equipped with the hand drive assembly in accordance with the invention.
Figure 3:
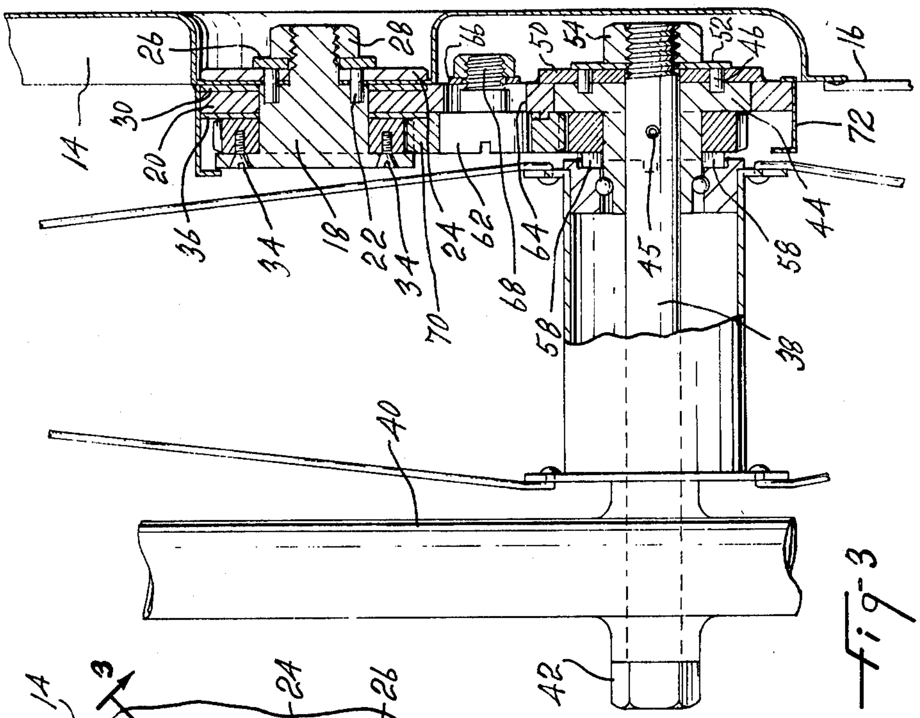
FIG. 3 illustrates a section view taken along line 3—3 of FIG. 2.
Figure 2:
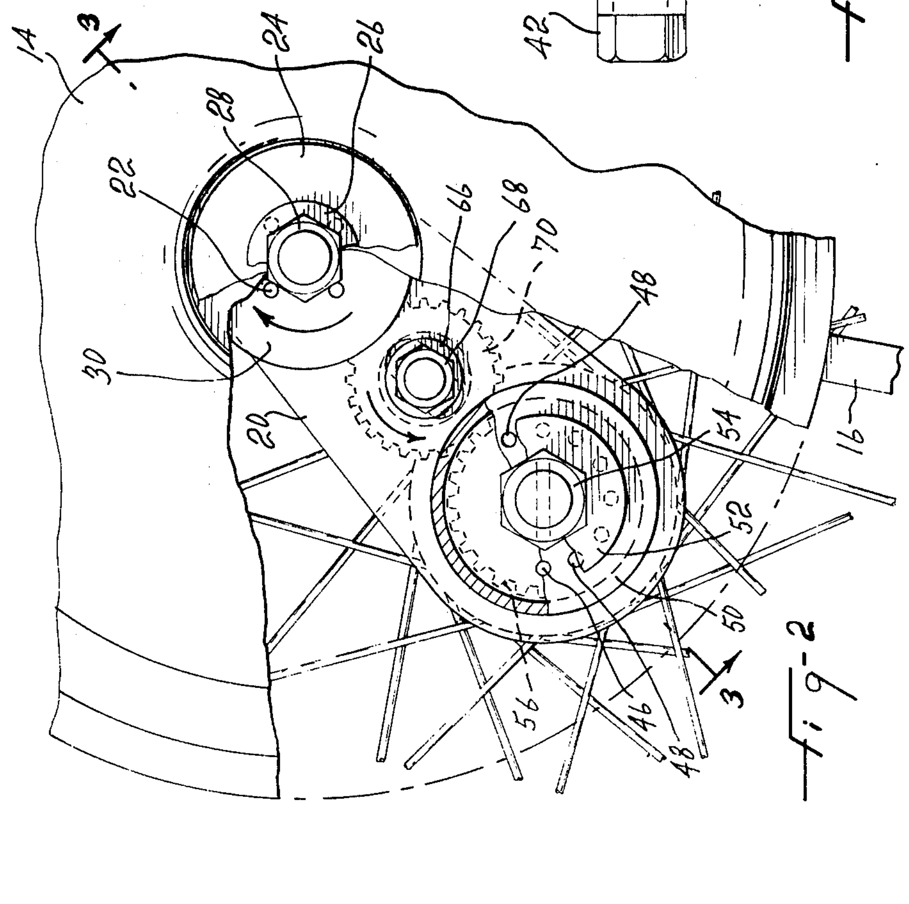
FIG. 2 illustrates an enlarged view of the hand drive assembly in accordance with the invention.
Figure 4:
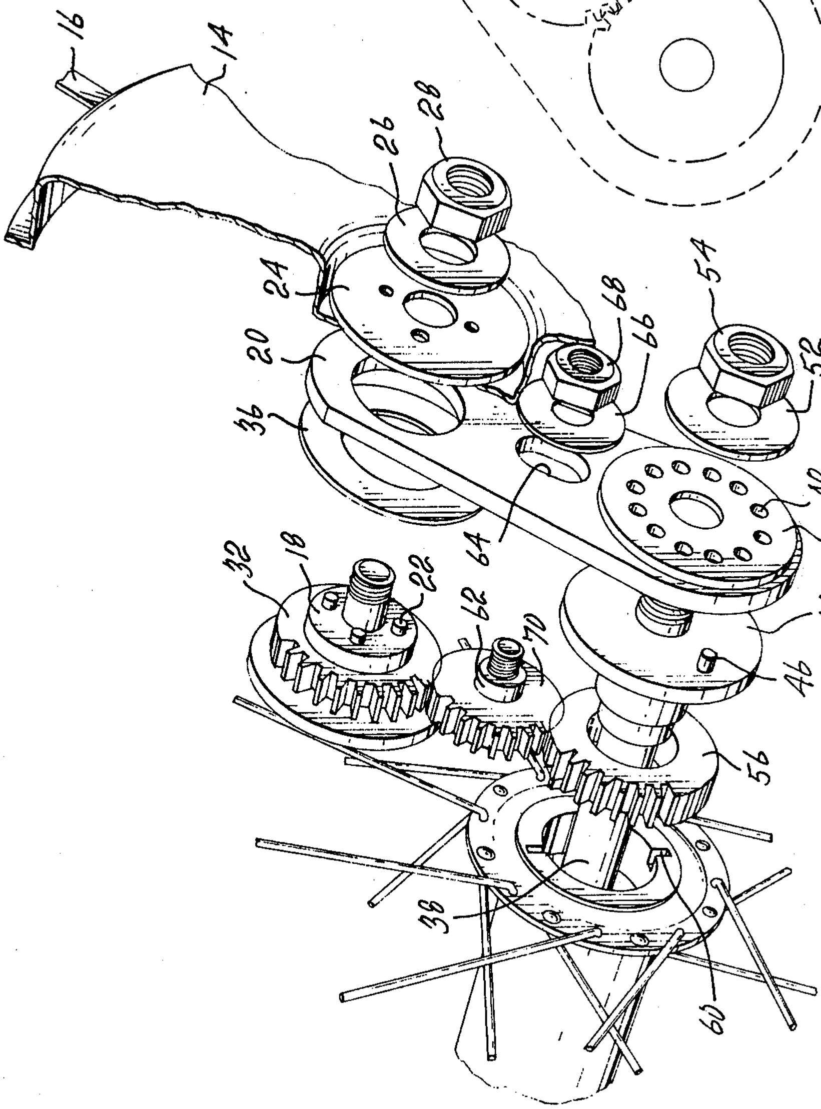
FIG. 4 illustrates an exploded view of the hand drive assembly shown in FIG. 2.

Referring to FIG. 1 of the drawings, there is shown a hand operated driving ring 10 for a regular wheelchair 12 including a chassis 40, a seat 2, a back-rest 3, a pair of front smaller diameter ground-engaging swivel wheels 4 terminating below seat 2 and a pair of back larger diameter ground-engaging driving wheels 5 extending below said seat 2. The rim of driving ring 10 is coupled to a hub disc 14 through spokes 16. As shown in FIGS. 2–4, the hand drive assembly comprises a driving axle 18 which is rotatably mounted on a gear plate 20. The driving axle 18 is provided with four dowel pins 22 engaging corresponding holes in the disc 14 for coupling the driving axle to the disc. A reinforcing washer plate 24, also provided with holes corresponding to the holes in the disc 14, engages the exterior of the disc, and the disc and the washer plate are secured to the main driving axle by means of washer 26 and nut 28.

In order to reduce friction, a bronze washer 30 is positioned between the gear plate 20 and the disc 14. A driving gear 32 is secured to the driving axle 18 by means of bolts 34 and a bronze washer 36 is provided between driving gear 32 and fixed gear plate 20 to reduce friction.

A main axle 38 is secured at one end to the chassis 40 of the chair by means of bolt 42 and provided at its other end with a ball bearing bushing 44 for rotatably mounting the regular back wheel 5 of the wheelchair. The ball bearing bushing 44 is secured to the axle by dowel pin 45 and is provided with two diametrically-spaced dowel pins 46 which selectively engage corresponding holes 48 in a circular disc 50 secured to gear plate 20. This permits adjustment ot the gear plate at a suitable angle A, preferably about 45° as shown in FIG. 1, so as to permit the wheelchair occupant to grab the driving ring 10 at a normal body and arm position for maximum strength and operating comfort. At such position, the driving ring is also well off the ground to prevent its soiling, and can be made of the substantially same diameter as the regular back wheel 5 of the chair for maximum torque. The gear plate 20 is secured to the ball bearing bushing by washer 52 and nut 54. A main gear 56 is rotatably mounted on ball bearing bushing 44. Gear 56 is provided with protrusions 58 which engage slots 60 in the back wheel 5 of the chair for rotating the back wheel 5.

An intermediate axle 62 is mounted in a slot 64 in the gear plate 20 and secured in position by means of washer 66 and nut 68. An intermediate gear 70 is rotatably mounted on the axle 62 for coupling driving gear 32 to main gear 56 so that the back wheel 5 of the chair rotates in the same direction as the driving ring 10. As shown in FIG. 3, a hood 72 may be secured to the edge of the gear plate for preventing clothes or any other article carried by the occupant from falling into the gears. Axles 18, 38, and 62 are parallel, horizontal and transverse to the wheel-chair. Each hand-operated driving ring 10 is located on the outside of the associated back wheel 5 and overlaps the latter.

Figure 6:
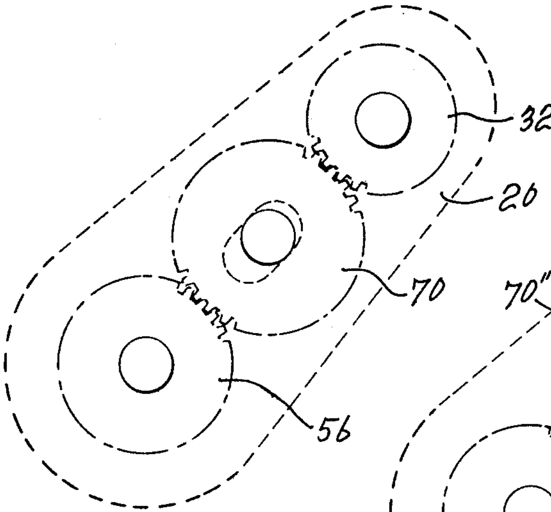
FIGS. 5 to 7 illustrate various combinations of intermediate and driving gears for providing variations in the gear ratio.
Figure 7:
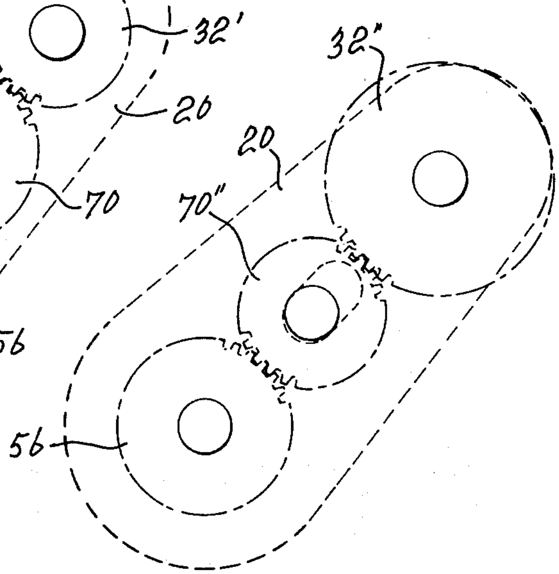
Figure 5:
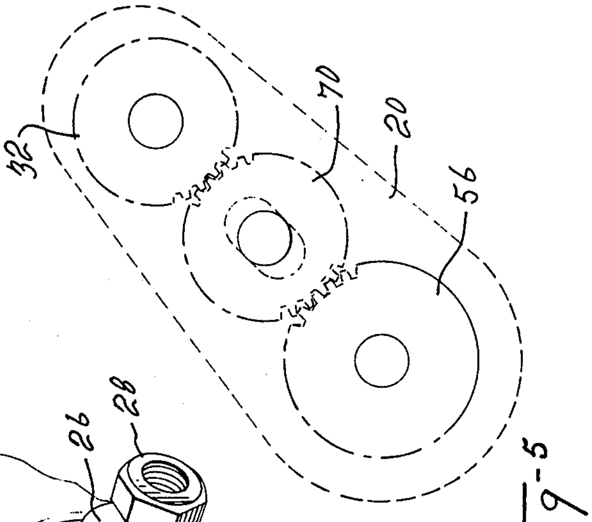

As shown in FIGS. 5, 6 and 7, gears 32 and 70 may be replaced by gears of various diameters 32' and 70' or 32" and 70", respectively, for varying the coupling ratio of the gears to suit the chair user. An adult would likely require a gear ratio allowing faster speed of movement whereas a child or an older person would likely require a gear ratio more suited to his strength. Slot 64 in the gear plate is made long enough so as to allow the necessary variation in the gear ratio.

Although the invention has been disclosed with reference to a preferred embodiment, it is to be understood that it is not limited to such embodiment and that other alternatives are also envisaged.

I claim:

1. In a wheelchair having a chassis, a seat, a back-rest, a pair of front, smaller diameter ground-engaging swivel wheels terminating below said seat, and a pair of back, large diameter ground-engaging driving wheels extending above said seat, said seat, back-rest and front and back wheels all carried by said chassis, said back wheels mounted on said chassis on each side of said seat for independent rotation about a horizontal axis transverse to and located below said seat in the region of said back-rest, the improvement comprising:

(a) a main gear gixed to, and co-axial with, each back wheel;
(b) a plate fixed to each side of said chassis;
(c) a pair of hand-operated driving rings of a diameter substantially equal to the diameter of said back wheels and carried by said plate for rotation about a transverse horizontal rotation axis parallel to the rotation axis of said back wheels and upwardly and forwardly spaced from said last-named rotation axis, the rotation axis of said driving rings being spaced from the rotation axis of said back wheels by a distance which is less than the diameter of said rings and back wheels, said rings being located on the outside of the respective back wheels and overlapping the latter;
(d) a driving gear fixed to, and co-axial with, each driving ring; and
(e) transmission means drivingly interconnecting said main gear and said driving gear for rotation of said gears in the same direction.

* * * * *